United States Patent
Hoffmann et al.

(10) Patent No.: US 6,640,550 B2
(45) Date of Patent: Nov. 4, 2003

(54) GAS TURBO-GROUP WITH COOLING AIR SYSTEM

(75) Inventors: Juergen Hoffmann, Rieden (CH); Stefan Rofka, Nussbaumen (CH); René Waelchli, Niedergoesgen (CH); Rolf Dittmann, Nussbaumen (CH)

(73) Assignee: Alstom (Switzerland) Ltd, Baden (CH)

(*) Notice: Subject to any disclaimer, the term of this patent is extended or adjusted under 35 U.S.C. 154(b) by 0 days.

(21) Appl. No.: 09/989,657

(22) Filed: Nov. 21, 2001

(65) Prior Publication Data

US 2003/0106322 A1 Jun. 12, 2003

(30) Foreign Application Priority Data

Nov. 2, 2001 (CH) .................... 2001 2016/01

(51) Int. Cl.[7] ............................................... F02C 7/18
(52) U.S. Cl. .......................................... 60/785; 60/806
(58) Field of Search ........................ 60/782, 785, 806, 60/262

(56) References Cited

U.S. PATENT DOCUMENTS 6,161,385 A 12/2000 Rebhan et al.

FOREIGN PATENT DOCUMENTS

| DE | 199 07 907 A1 | 8/2000 |
|----|---|---|
| DE | 100 41 413 A1 | 3/2001 |
| EP | 0 062 932 B1 | 10/1982 |
| EP | 0 440 164 A1 | 8/1991 |
| EP | 0 515 995 A2 | 12/1992 |
| EP | 0 620 362 B1 | 10/1994 |
| EP | 0 684 369 B1 | 11/1995 |
| EP | 0 995 891 A2 | 4/2000 |
| EP | 1 028 230 A1 | 8/2000 |
| EP | 1 128 039 A2 | 8/2001 |
| JP | 55-112826 | 9/1980 |
| JP | 05-059965 | 3/1993 |

Primary Examiner—Louis J. Casaregola
(74) Attorney, Agent, or Firm—Burns, Doane, Swecker & Mathis, L.L.P.

(57) ABSTRACT

A gas turbo set (1, 2, 3) is equipped with at least a cooling air system (20, 21). Throttle points (22, 23) are arranged as throttling points in the cooling air flowpath, for the purpose of defining the cooling air mass flow. Said manifolds are bypassed by bypass lines (24). Means (25) are arranged in said bypass lines for adjusting the bypass mass flow. Thus, the cooling air mass flow can be varied without acting on the main cooling air flow as such.

20 Claims, 2 Drawing Sheets

GAS TURBO-GROUP WITH COOLING AIR SYSTEM

FIELD OF THE INVENTION

The invention relates to a gas turbo-group according to the preamble of claim 1.

BACKGROUND OF THE INVENTION

The requirements for performance and efficiency of gas turbo-groups are paralleled by rising requirements both for cooling the thermally highly loaded machine components on the one hand, and for the design of the cooling system on the other hand. Sufficient cooling therefore must be ensured in the interest of operational safety. On the other hand, the consumption of cooling air should be reduced as much as possible. EP 62932 suggested cooling the components of a gas turbine with steam in the closed cycle. This requires a relatively complex sealing of the components carrying the cooling steam. At the same time, the components are cooled solely by convection; no use is hereby made of the effect of a cooling film for reducing the introduction of heat. A number of other documents, for example EP 684 369 or EP 995 891 and the corresponding U.S. Pat. No. 6,161,385 suggest the use of steam or of a steam/air mixture for cooling film-cooled components. However, such processes require relatively large amounts of steam that must fulfill high requirements with respect to purity and superheating in order to prevent obstructions of the film cooling holes that often measure only a few tenths of a millimeter across. Even if the required amount and quality of steam is available, the cooling of the gas turbo-group with steam is not inherently ensured, which is in contrast to cooling with compressor extraction air.

Consequently, the cooling with compressor extraction air continues to have a number of solid advantages, whereby the extracted cooling air volume should be minimized in the interest of the efficiency of the working process. As a result, the design of cooling air systems more and more pushes the limits so as to still provide sufficient cooling even at the most unfavorable operating point—seen from the standpoint of cooling technology—yet without using too much cooling air. On the one hand, this means a high sensitivity for deviations of the working process from the design point if, for example, as a result of shifting pressure conditions in a machine, the cooling air volumes vary. On the other hand, an overcooling of thermally loaded components results in a series of other operating points so that the potential performance and efficiency levels are not achieved.

It has therefore been repeatedly suggested, for example in EP 1 028 230 to provide variable throttle points in the cooling air path. DE 199 07 907 suggests to directly adjust the pre-pressure of the cooling air with adjustable compressor rotating rows arranged immediately next to an extraction point for the cooling air. While the implementation of these measures is indeed promising, they are by nature very complicated and hardly suitable for retrofitting existing gas turbo-groups. In addition, the installation of moving parts into the cooling system, as disclosed in EP 1 028 230, is associated with the latent risk of an obstruction of the cooling air lines should a mechanical failure of components occur.

SUMMARY OF THE INVENTION

The present invention is based on the objective of preventing the disadvantages of the state of the art in cooling a gas turbo-group of the initially mentioned type.

This objective is realized with the entirety of the characteristics of claim 1.

This means that it is the core of the invention to bypass a throttle point in the cooling air channels—a throttle point known to the expert from the state of the art for adjusting the cooling air mass flow in a defined manner—and to use suitable means for designing the bypass mass flow in a variable manner, for example, by locating a regulating means in a second flow channel that acts as a bypass; alternatively to a variable throttling of the bypass, means that exert a variable motive force on the bypass mass flow, for example ejectors, also can be provided. These means are realized in a way so as to be accessible to external control interventions. It is useful that the second flow channel has smaller dimensions than the cooling air channel; in particular, the dimensions of the second flow channel are such that the throughput mass flow accounts for no more than 80% of the mass flow of the main cooling air channel. Values ranging from 20% to 50% are found to be favorable; if it is sufficient for the desired variation range, the size of the bypass mass flow also may be designed with values of 10% and less or even only 5% of the main mass flow, or even less. The design mass flow in the bypass hereby must correspond at least to the desired control dynamics. A particularly advantageous aspect of the solution according to the invention is that it is not necessary to design the entire cooling air mass flow as variable, but that only a partial flow must be varied by suitable means. It is hereby furthermore advantageous that, in particular when cooling the stator, this bypass channel can be passed to a point of the gas turbo-group that is accessible from the outside, while the main cooling system is able to extend in a compact manner along the machine. This is an important advantage with respect to maintenance and adjustability; in addition, such a measure is much more suitable for the retrofitting of existing systems than a variable throttling of the entire main cooling air mass flow.

An advantage with respect to operational safety is that the bypass line is provided, upstream from the union with the main cooling air flow, with a retention system that prevents debris from entering and blocking the cooling air channels if the regulating means in the bypass should break.

BRIEF DESCRIPTION OF THE DRAWINGS

The invention is explained in more detail below in reference to examples illustrated in the drawing. The figures show advantageous embodiments of the invention, whereby details not necessary for directly understanding the invention have been omitted.

The embodiments and figure should only be understood as instructive, and in no case as restricting.

DETAILED DESCRIPTION OF THE PREFERRED EMBODIMENTS

Figure 1:
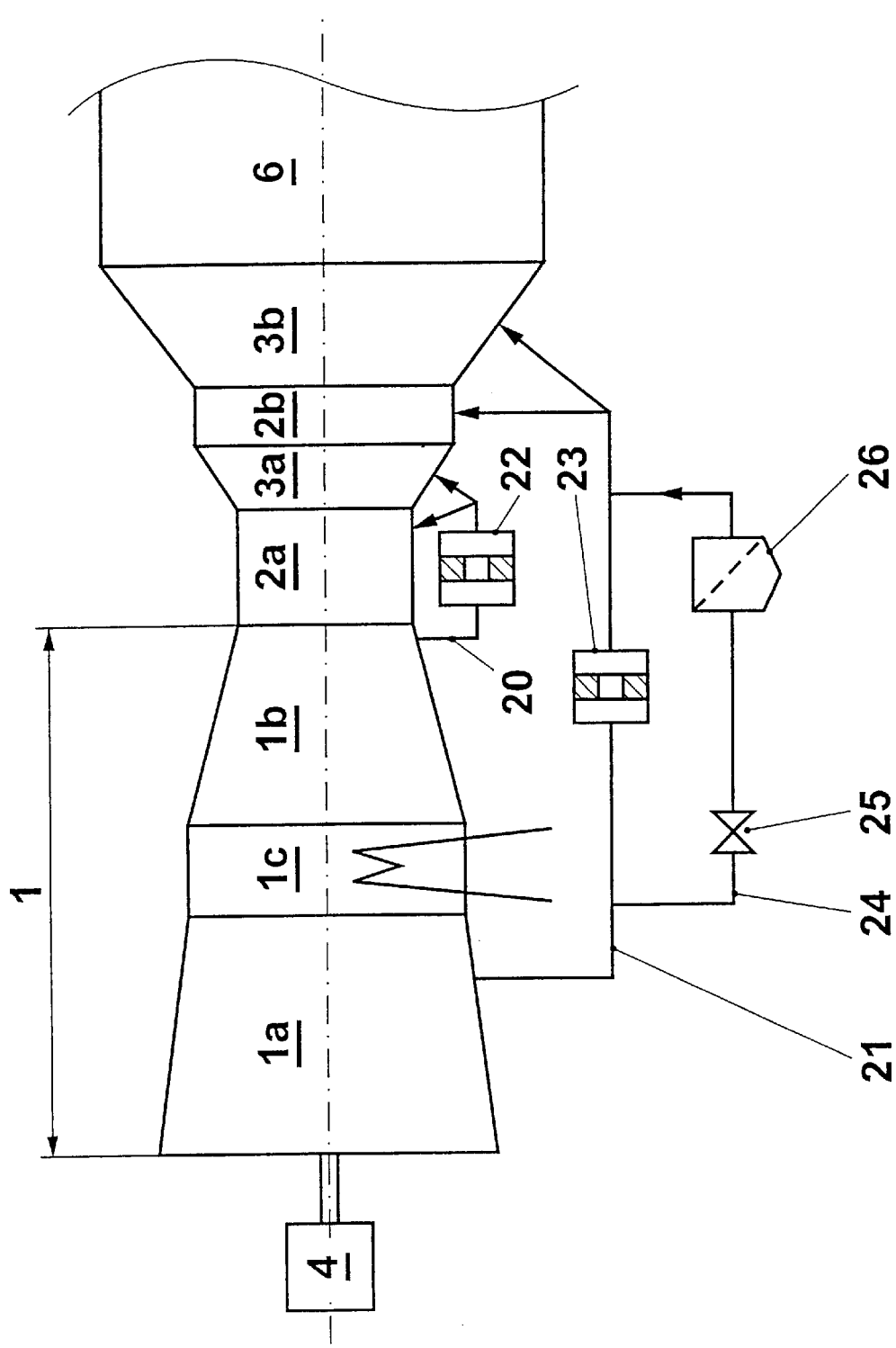
FIG. 1 illustrates a gas turbo-group according to an embodiment of the invention.

FIG. 1 shows a gas turbo-group of the most current construction, sequential combustion. Such a gas turbo-group has been disclosed in EP 620 362. A compressor 1 condenses air to a high pressure and discharges it into a first combustion chamber 2a, in which a first fuel amount is burned. The condensed flue gas is partially expanded in a first turbine, high-pressure turbine 3a, whereby typically a pressure ratio of 1.5 to 2 is achieved, and then flows, still at high temperature and high pressure, into a second combustion chamber 2b. The oxygen content of the flue gas is still rather high after the first combustion chamber, typically near 15% to 17%. This makes it possible to add and burn additional fuel in the second combustion chamber 2b without problems. The reheated hot gas is expanded in a turbine 3b to approximately ambient pressure and flows off into the waste gas section 6. Here, a waste heat steam generator could easily be located; principally, gas turbo-groups with sequential combustion are particularly well-suited for applications in combination systems. During their expansion in turbines 3a and 3b, the flue gases output power that is used for driving the compressor 1 and a generator 4. Because of the high pressure ratio realized in such a gas turbo-group, the cooling system is designed with at least two different pressure stages; in the present case with a high-pressure cooling system 20 and a low-pressure cooling system 21. The high pressure cooling system extracts air from the compressor outlet and uses it for cooling the first combustion chamber 2a and the high-pressure turbine 3a. The low-pressure cooling system 21 extracts air from an intermediary compressor stage and uses it for cooling the second combustion chamber 2b and low-pressure turbine 3b. This division into two parts of the cooling system makes it possible to supply the high-pressure part of the hot gas path with high-pressure cooling air, and on the other hand, prevents an excessive throttling, which is associated with high losses, of high-pressure cooling air for cooling the low-pressure section of the hot gas path. Throttle points, typically orifices 22, 23, for the defined adjustment of the cooling air mass flows, are arranged in the cooling air lines of the cooling systems 20, 21. The compressor 1 is divided into a first partial compressor 1a and a second partial compressor 1b, between which an intermediate cooler 1c is located. The operation of the intermediate cooler 1c reduces the power required for driving the compressor, thus increasing the efficiency and effective energy of the gas turbo-group. This effect also can be achieved with a water injection into the compressor or an over-saturation of the suction air with humidity, which, as a result of the evaporization of this humidity, brings about an intensive internal cooling of the compressor. The cooling of the air in the compressor also has another effect: As the expert is able to determine during a simple deliberation of the stage kinematics, the pressure build-up is shifted to the rear compressor stages during operation with intermediate cooling. While the relative pressure decrease via the turbine stages remains almost unchanged, the pressure build-up in the compressor stages is shifted clearly into the second partial compressor 1b. This results in a significant reduction of the motive pressure differential by means of the low-pressure cooling system 21, and thus in a reduction of the low-pressure cooling air mass flow. If, vice versa, the throttle point 23 of the low-pressure cooling system 21 is sized so that the cooling air mass flow is sufficient for operation with cooling in the compressor, this results in a clear overcooling of the low-pressure hot gas path, i.e., assemblies 2b and 3b, for operation without compressor cooling, with negative consequences for performance and efficiency. According to the invention a second flow channel 24 is therefore located so that it branches off the main cooling air channel upstream from the throttle point 23, and again joins into the main flow channel downstream from the throttle point. Normally, this bypass channel is sized so that only a fraction of the entire cooling air volume flows through it, which is however sufficient during operation with compressor cooling to compensate the reduced flow in the main flow channel that results from the reduction of the motive pressure decrease. In the bypass channel, a regulating means 25 for varying the bypass flow is provided. A sieve 26 functions as a retention device and prevents debris from entering and blocking the cooling system if the regulating means 25 should break.

Figure 2:
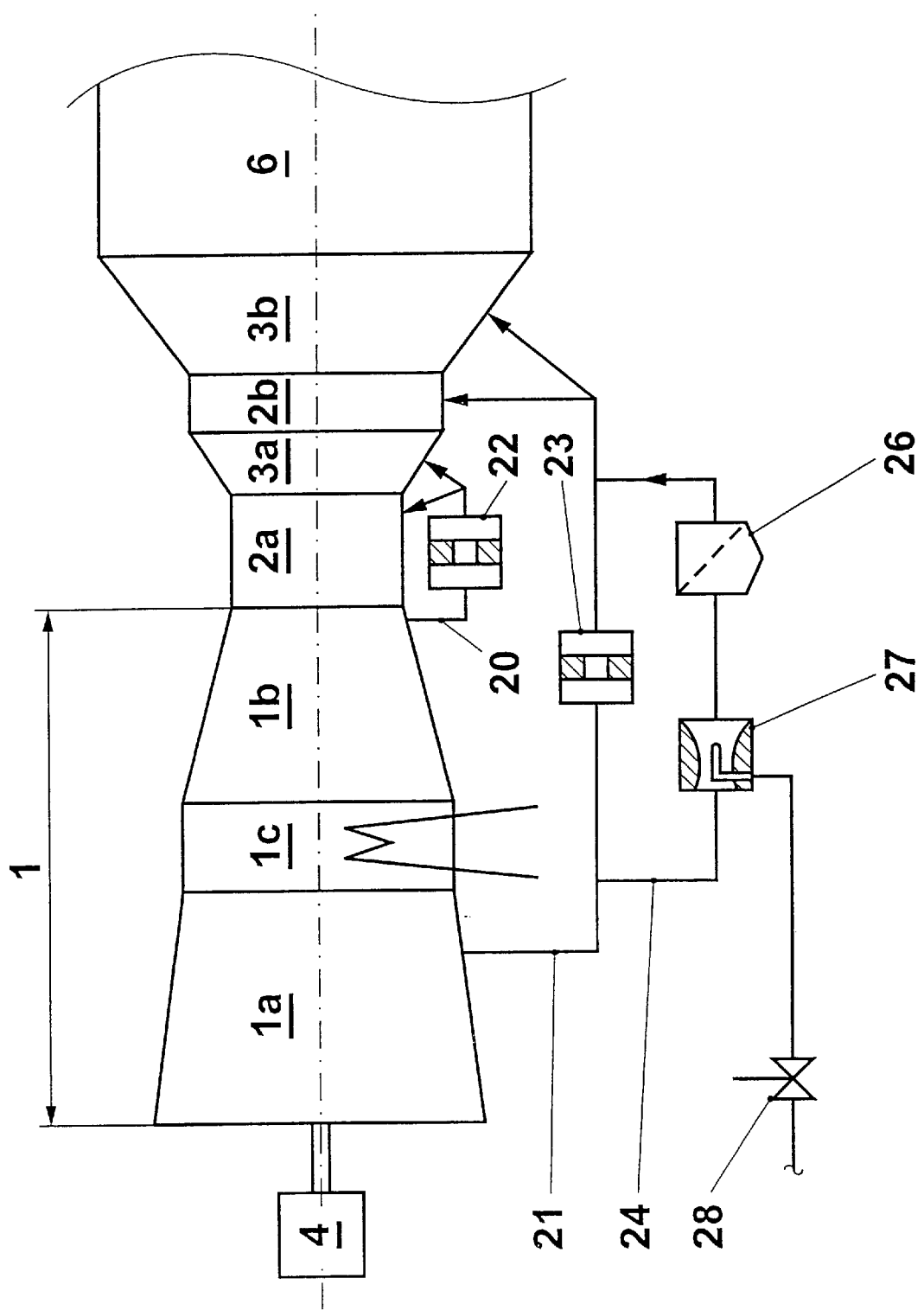
FIG. 2 illustrates a gas turbo-group according to an embodiment of the invention.

A second possibility for varying the bypass flow is shown in FIG. 2. Instead of a variable throttle point, the bypass channel 24 is provided with an ejector 27 as a means for variably driving the bypass flow. As a motive means for the ejector, in particular a small partial flow of the high-pressure cooling air can be used. In combination systems and other types of systems with steam generators, in particular also if cooling air coolers or compressor intermediate coolers are executed as steam generators, as described in DE 100 41 413 or, respectively, in EP 515 995, a steam volume can be used as a motive means for the ejector 27. Principally, a supply from any desired external sources is also possible, but is usually not practical. The fuel supply is not established in the drawing. The fuel mass flow, and therefore the motive force exerted by the ejector and the bypass mass flow, can be adjusted via the regulating means 28.

Similar to an intermediate cooling, the pressure build-up in the compressor also can be shifted by adjusting several guide rows, which also can be compensated by the invention with respect to the cooling air mass flows.

The invention furthermore makes it possible to reduce the cooling air volume to a minimum necessary for operational safety, for example, dependent on the hot gas temperature in the region of the components to be cooled, or dependent on a material temperature, pressure losses, etc., and to increase the cooling air volume accordingly for a high gas turbine load. To this extent, numerous possibilities for integrating the invention reasonably with the control system of a gas turbo-group are conceivable.

Naturally, the invention is limited to the exemplary embodiments; in view of the above explanations, the expert will be able to see a large number of possible embodiments of the invention as characterized in the Claims. The invention easily could also be used in the high-pressure cooling system 20. The invention also could be used if a pressure stage has only one cooling system or if it has more than two pressure stages.

LIST OF REFERENCE SYMBOLS 1 compressor
1a Partial compressor, low-pressure compressor
1b Partial compressor, high-pressure compressor
1c Intermediate cooler
2a First combustion chamber, high-pressure combustion chamber
2b Second combustion chamber; low-pressure combustion chamber
3a First turbine, high-pressure turbine
3b Second turbine, low-pressure turbine
4 Generator
6 Waste gas section, stack
20 High-pressure cooling system
21 Low-pressure cooling system
22 Throttle point
23 Throttle point
24 Second flow channel, bypass line
25 Regulating means
26 Retention device
27 Ejector
28 Regulating means

What is claimed is:

1. A gas turbo-group with a cooling air system, through which, during operation, at least one cooling air mass flow flows from a compressor to thermally highly loaded components of the gas turbo-group, whereby in at least one cooling air channel of the cooling air system a throttle point for adjusting the cooling air mass flow is provided, wherein a second flow channel, acting as a bypass channel, is provided, which branches off the at least one cooling air channel upstream from a throttle point and joins into the at least one cooling air channel downstream from the throttle point, and which second flow channel is provided with means for varying the bypass mass flow, and the flow cross-section of the second flow channel is smaller than the flow cross-section of the at least one cooling air channel.

2. The gas turbo-group as claimed in claim 1, wherein the second flow channel is designed for a smaller mass flow than the at least one cooling air channel.

3. The gas turbo-group as claimed in claim 2, wherein the design mass flow of the second flow channel is smaller than 80% of the design mass flow of the at least one cooling air channel.

4. The gas turbo-group as claimed in claim 1, wherein an externally adjustable regulating means is provided in the second flow channel.

5. The gas turbo-group as claimed in claim 1, wherein an ejector is provided in the second flow channel.

6. The gas turbo-group as claimed in claim 1, wherein upstream from the union of the second flow channel with the at least one cooling air channel a retention device is provided in the second flow channel.

7. The gas turbo-group as claimed in claim 1, wherein the gas turbo-group is a gas turbo-group with sequential combustion.

8. The gas turbo-group as claimed in claim 1, wherein the gas turbo-group is provided with at least two cooling systems with different pressure stages, in particular with a high-pressure cooling system and a low-pressure cooling system, whereby the high-pressure cooling system is supplied from one of the end stages of the compressor, and the low-pressure cooling system is supplied by an intermediary stage of the compressor.

9. The gas turbo-group as claimed in claim 8, wherein the high-pressure cooling system communicates with a first combustion chamber and a first turbine of a gas turbo-group with sequential combustion, and the low-pressure cooling system communicates with a second combustion chamber and a second turbine of a gas turbo-group with sequential combustion.

10. The gas turbo-group as claimed in claim 3, wherein the design mass flow of the second flow channel ranges between 20% and 50% of the design mass flow of the at least one cooling air channel.

11. A gas turbo-group with a cooling air system, through which, during operation, at least one cooling air mass flow flows from a compressor to thermally highly loaded components of the gas turbo-group, whereby in at least one cooling air channel of the cooling air system a throttle point for adjusting the cooling air mass flow is provided, wherein a second flow channel, acting as a bypass channel, is provided, which branches off the at least one cooling air channel upstream from a throttle point and joins into the at least one cooling air channel downstream from the throttle point, and which second flow channel is provided with means for varying the bypass mass flow and wherein an ejector is provided in the second flow channel.

12. The gas turbo-group as claimed in claim 11, wherein the flow cross-section of the second flow channel is smaller than the flow cross-section of the at least one cooling air channel.

13. The gas turbo-group as claimed in claim 12, wherein the second flow channel is designed for a smaller mass flow than the at least one cooling air channel.

14. The gas turbo-group as claimed in claim 13, wherein the design mass flow of the second flow channel is smaller than 80% of the design mass flow of the at least one cooling air channel.

15. The gas turbo-group as claimed in claim 14, wherein the design mass flow of the second flow channel ranges between 20% and 50% of the design mass flow of the at least one cooling air channel.

16. The gas turbo-group as claimed in claim 11, wherein an externally adjustable regulating means is provided in the second flow channel.

17. The gas turbo-group as claimed in claim 11, wherein upstream from the union of the second flow channel with the at least one cooling air channel a retention device is provided in the second flow channel.

18. The gas turbo-group as claimed in claim 11, wherein the gas turbo-group is a gas turbo-group with sequential combustion.

19. The gas turbo-group as claimed in claim 11, wherein the gas turbo-group is provided with at least two cooling systems with different pressure stages, in particular with a high-pressure cooling system and a low-pressure cooling system, whereby the high-pressure cooling system is supplied from one of the end stages of the compressor, and the low-pressure cooling system is supplied by an intermediary stage of the compressor.

20. The gas turbo-group as claimed in claim 19, wherein the high-pressure cooling system communicates with a first combustion chamber and a first turbine of a gas turbo-group with sequential combustion, and the low-pressure cooling system communicates with a second combustion chamber a second turbine of a gas turbo-group with sequential combustion.

* * * * *